United States Patent
Flores Aguirre et al.

(10) Patent No.: US 10,532,816 B2
(45) Date of Patent: Jan. 14, 2020

(54) AMENITIES MODULES

(71) Applicant: Safran Seats USA LLC, Gainesville, TX (US)

(72) Inventors: Raul Daniel Flores Aguirre, Versailles (FR); Nguyen Foek Le, Arlington, TX (US); Dafne Diaz, Chihuahua (MX); Mario Herrera, Chihuahua (MX); Jean-Christophe Gaudeau, Plaisir (FR); Jose Ramon Madrigal, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 15 days.

(21) Appl. No.: 15/839,714

(22) Filed: Dec. 12, 2017

(65) Prior Publication Data
US 2019/0176989 A1   Jun. 13, 2019

(51) Int. Cl.
*B64D 11/00* (2006.01)
*B64D 11/06* (2006.01)

(52) U.S. Cl.
CPC .... *B64D 11/00152* (2014.12); *B64D 11/0638* (2014.12)

(58) Field of Classification Search
CPC ............... B64D 11/0638; B64D 11/00152
USPC ........................ 297/217.3, 163, 188.07
See application file for complete search history.

(56) References Cited

U.S. PATENT DOCUMENTS

| | | | | |
|---|---|---|---|---|
| 7,114,772 B2 * | 10/2006 | Kobayashi | ............ | B60N 2/206 297/188.04 |
| 8,141,948 B2 * | 3/2012 | Cassellia | ............ | B60K 35/00 297/188.04 |
| 8,826,830 B2 * | 9/2014 | Pajic | ............ | B64D 11/0015 297/163 |
| 9,573,687 B2 * | 2/2017 | Stephens | ............ | B64D 11/0638 |
| 9,919,802 B2 * | 3/2018 | Stephens | ............ | B64D 11/0638 |
| 2015/0336672 A1 | 11/2015 | Hommel et al. | | |
| 2016/0249073 A1 | 8/2016 | Margis et al. | | |

FOREIGN PATENT DOCUMENTS

| | | |
|---|---|---|
| EP | 2708413 | 3/2014 |
| WO | 2015013661 | 1/2015 |

OTHER PUBLICATIONS

European Patent Application No. 18205600.2, Extended European Search Report, dated Apr. 24, 2019.

\* cited by examiner

*Primary Examiner* — Anthony D Barfield
(74) *Attorney, Agent, or Firm* — Kilpatricktownsend & Stockton LLP; Dean W. Russell; Eben D. Allen

(57) ABSTRACT

A passenger seat includes a tray table and an amenities module. The passenger seat has at least one first configuration where the amenities module is concealed by the tray table and at least one second configuration where the amenities module is exposed. The tray table is approximately parallel to a seatback surface of the passenger seat in the at least one first configuration and in the at least one second configuration.

18 Claims, 7 Drawing Sheets

AMENITIES MODULES

FIELD OF THE INVENTION

The field of the invention relates to amenities modules for passenger seats in aircraft or the like.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and/or arm rests of the passenger seats.

With the advent of portable electronic devices ("PEDs"), such as tablet computers, mobile phones, smart phones, handheld video game systems, personal digital assistants, palmtop computers, DVD players, data and audio-video media, multi-media enabled devices, laptop computers, and other similar electronic devices, many passengers prefer to use their own PEDs, rather than the OBE or IFE components that are mounted in the passenger seats.

The rate at which PEDs, namely mobile phones, tablets, portable computers, personal digital assistants ("PDAs"), have been evolving has been exponential. These devices are constantly increasing in functions and decreasing/altering in size, making them more portable and at the same time able to perform more tasks. This evolution has led to passengers carrying their personal information and media on these devices with the expectation of using them while traveling.

To this point, there have been very few examples of the integration of these PEDs into airplane seats in any specific way to the seat, other than providing a location on a tray table, such as a groove to hold the PED, and sometimes a power connection to charge them. Conventional mounting locations are in the tray table, which must be stowed during certain times during flight.

There is a need for passengers to have a way to hold or store these PEDs while in flight in a manner that allows the PEDs to be used and enjoyed at any given moment. In some cases, it may be desirable to provide a way for passengers to connect their PEDs to the OBE or IFE systems, so that they may use their own PEDs in lieu of the OBE or IFE systems. In other cases, it may be desirable to provide a way for passengers to connect their PEDs to the OBE or IFE systems to use in conjunction with the system's video display or to receive power for their PEDs or otherwise. Some conventional seats include provisions for PEDs located behind the tray table, which limits the availability of such features to times when the tray table is deployed. In addition, provisions located behind the tray table may not be ergonomically suited to small or large passengers.

As a result, there is a need for a support structure and interface system for PEDs that is always available (regardless of whether the tray table is deployed) and adaptable to a wide range of passengers (and to a range of PED sizes, shapes, and thicknesses, and that does not create the need for an extra components or adapters). Such a solution eliminates the need for airlines to provide a large number of cases/adapters, which represents additional weight and the need for additional storage space, as well as eliminating the costs for passengers to purchase an additional case/adapter for his or her PED. Such a solution also allows passengers to use their PEDs with or without a case, and to make the tray tables available for meals, documents, or any other object, or to allow passengers to stow the tray tables while still having the PEDs securely placed for use and/or viewing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises: a tray table; and an amenities module, wherein: the passenger seat comprises at least one first configuration where the amenities module is concealed by the tray table; the passenger seat comprises at least one second configuration where the amenities module is exposed; and the tray table is approximately parallel to a seatback surface of the passenger seat in the at least one first configuration and in the at least one second configuration.

In some embodiments, the amenities module comprises at least one of a USB port, an AC power port, an inductive wireless power unit, a PED holder, a reading light, a headphone port, WiFi connection, and a deployable mechanical attachment.

In the first configuration, in certain embodiments, the amenities module is disposed between the tray table and a rear surface of the passenger seat.

In some embodiments, the amenities module is movable relative to the passenger seat; and the at least one second configuration comprises at least one of (i) a lowermost position where the amenities module is located below the tray table and (ii) an uppermost position where the amenities module is located above the tray table.

The passenger seat, in certain embodiments, further comprises a left frame member and a right frame member, wherein the amenities module slidably engages at least one of the left frame member and the right frame member.

In certain embodiments, at least one of the left frame member and the right frame member comprises at least one stop block for limiting movement of the amenities module.

In some embodiments, the amenities module comprises a left arm extending from the amenities module toward the left frame member and a right arm extending from the amenities module toward the right frame member.

In certain embodiments, the left arm comprises a left slider portion that interfaces with the left frame member; and the right arm comprises a right slider portion that interfaces with the right frame member.

The left frame member and the right frame member, in certain embodiments, each comprise a channel; the left slider portion comprises a protrusion that engages the channel of the left frame member; and the right slider portion comprises a protrusion that engages the channel of the right frame member.

In some embodiments, the protrusion of the left slider portion and the protrusion of the right slider portion each comprise a "T" shape.

The tray table, in certain embodiments, is slidably movable relative to the passenger seat; and the at least one second configuration comprises the tray table in a lower position below the amenities module.

The passenger seat, in some embodiments, further comprises an arm for attaching each side of the tray table, wherein each side of the tray table comprises a channel that interfaces with the respective arm.

In certain embodiments, the passenger seat further comprises a locking mechanism for securing the passenger seat in the first configuration such that the tray table is in an upper position that conceals the amenities module.

According to certain embodiments of the present invention, an amenities module for a passenger seat comprises: a main body; a left arm extending from a left side of the main body; a right arm extending from a right side of the main body; and at least one of a USB port, an AC power port, an inductive wireless power unit, a PED holder, a reading light, a headphone port, WiFi connection, and a deployable mechanical attachment, wherein: the amenities module is slidably attached to a frame of the passenger seat; the amenities module comprises a concealed position where the amenities module is concealed by a tray table of the passenger seat; the amenities module comprises a lowermost position where the amenities module is below the tray table of the passenger seat and exposed; and the amenities module comprises an uppermost position where the amenities module is above the tray table of the passenger seat and exposed.

In certain embodiments, the left arm comprises a left slider portion that interfaces with a left frame member of the passenger seat; and the right arm comprises a right slider portion that interfaces with a right frame member of the passenger seat.

In some embodiments, the left frame member and the right frame member each comprise a channel; the left slider portion comprises a protrusion that engages the channel of the left frame member; and the right slider portion comprises a protrusion that engages the channel of the right frame member.

The protrusion of the left slider portion and the protrusion of the right slider portion, in certain embodiments, each comprise a "T" shape.

According to certain embodiments of the present invention, a passenger seat comprises: a tray table; and an amenities module, wherein: the tray table comprises an upper position where the tray table is approximately parallel with a seatback of the passenger seat and the amenities module is concealed by the tray table; and the tray table comprises a lower position where the tray table is approximately parallel with a seatback of the passenger seat and the tray table is translated below the amenities module such that the amenities module is exposed.

The passenger seat, in certain embodiments, further comprises an arm for attaching each side of the tray table, wherein each side of the tray table comprises a channel that interfaces with the respective arm.

In some embodiments, passenger seat further comprises a locking mechanism for securing the tray table in the upper position.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-6 illustrate embodiments of amenities modules 101, 201 for passenger seats 10 in vehicles such as an aircraft where each passenger seat 10 includes a seatback surface 14.

Figure 1:
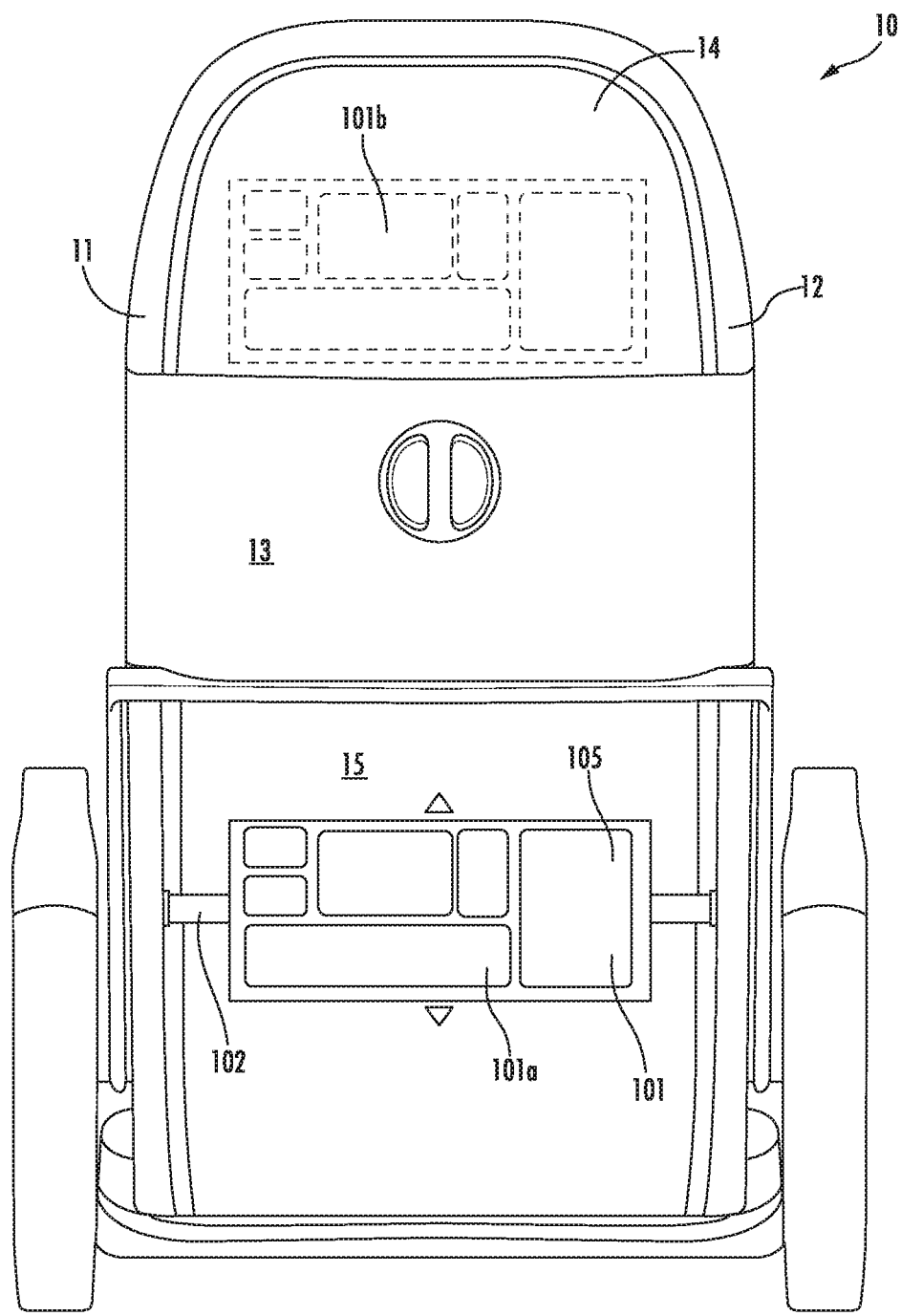
FIG. 1 is a rear view of a passenger seat that includes an amenities module according to certain embodiments of the present invention.

In some embodiments, as shown in FIGS. 1-3B, the passenger seat 10 may include a left frame member 11, a right frame member 12, a tray table 13 and an amenities module 101 that is movable relative to the seat 10. The passenger seat 10 may include a recessed area 15 such that the amenities module 101 is located in the recessed area 15 and is movable between a lowermost position 101a and an uppermost position 101b. When moving within the recessed area 15 between the lowermost position 101a and the uppermost position 101b, the amenities module 101 moves such that the amenities module 101 is located between the seatback surface 14 and the tray table 13 (i.e., the recessed area 15 is on a rear side of the amenities module 101 and the tray table 13 is on a front side of the amenities module 101). In other words, the amenities module 101 may include at least one third position where the amenities module 101 is concealed by the tray table 13 when the tray table 13 is in the stowed position (as shown in FIG. 1). When the amenities module 101 is in the third position and the tray table 13 moves from the stowed position to a deployed position (e.g., after pivoting about an axis near a bottom edge of the tray table 13), at least a portion of the amenities module 101 may be exposed. As shown in FIG. 1, the amenities module 101 may include at least one position where the entire amenities module 101 is visible while the tray table 13 is in the stowed position. In some embodiments, the amenities module 101 has (1) at least one position below the tray table 13 where the entire amenities module 101 is visible and (2)

at least one position above the tray table 13 where the entire amenities module 101 is visible.

Figure 2:
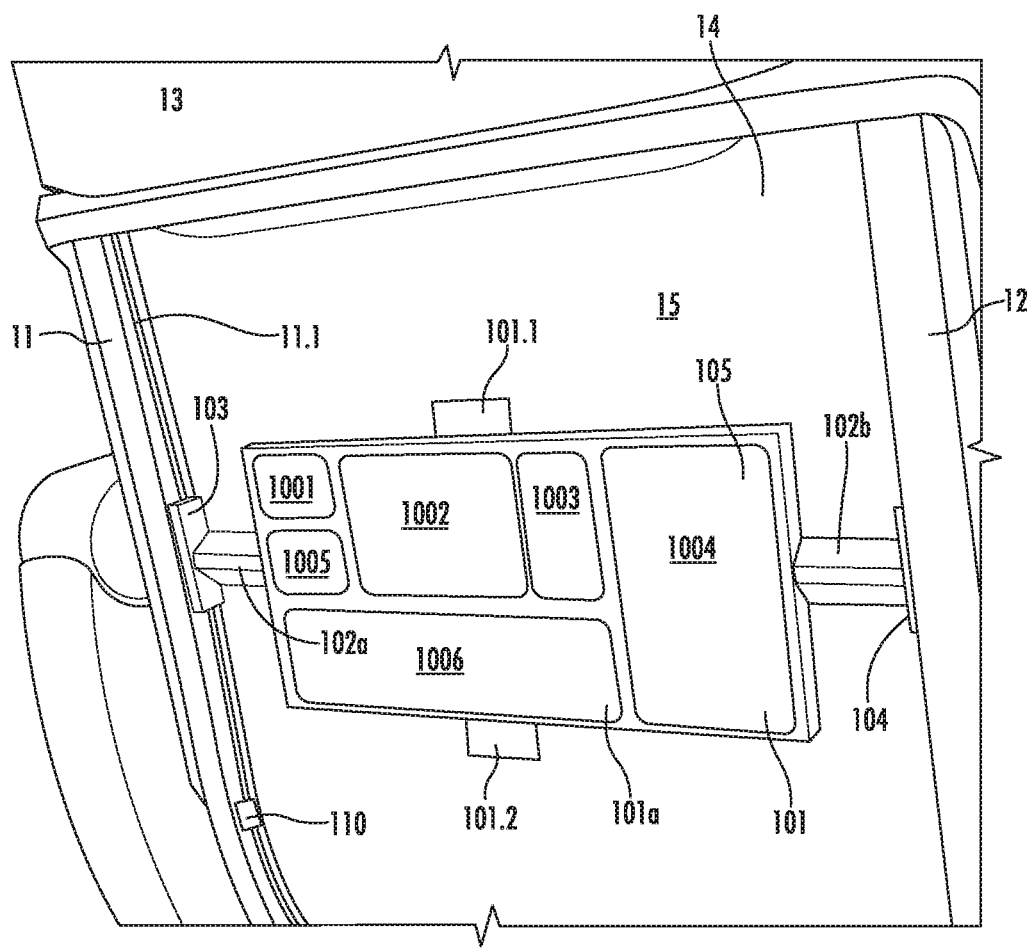
FIG. 2 is a perspective view of the amenities module of FIG. 1.

The amenities module 101 may have a main body 105 with a rectangular shape and may include at least one arm 102 extending toward the left frame member 11 and/or the right frame member 12. In some embodiments, a left arm 102a extends from the amenities module 101 to the left frame member 11 and a right arm 102b extends from the amenities module 101 to the right frame member 12. The left arm 102a may be attached to a left slider portion 103 and the right arm 102b may be attached to a right slider portion 104. The amenities module 101 may also include a protrusion (e.g., a tab or a strap) at the top and/or bottom of the amenities module 101. For example, as shown in FIG. 2, the amenities module 101 may include an upper protrusion 101.1 and/or a lower protrusion 101.2 that the user may use to pull the amenities module 101 up or down relative to the passenger seat 10.

In some embodiments, the amenities module 101 includes a plurality of sections including a first section 1001, a second section 1002, a third section 1003, a fourth section 1004, a fifth section 1005, and a sixth section 1006. Although FIG. 2 illustrates six sections, the amenities module 101 may include any number of sections (e.g., fewer or more than six). The sections may, for example, include at least one Universal Serial Bus (USB) port, at least one alternating current (AC) power port, an inductive wireless power unit (to provide wireless charging for a PED), a PED holder (e.g., a pivoting door/shelf, an articulating arm, or any other appropriate attachment mechanism), a reading light, headphone port (3.5 mm), a Bluetooth connection, a wireless local area network (WiFi) connection, a deployable mechanical attachment (e.g., a coat hook, a shelf, a storage pouch), or any other appropriate section. The quantity, type, layout, and other features for the sections are customizable based on needs of the consumer or provider (e.g., airline).

Figure 3A:
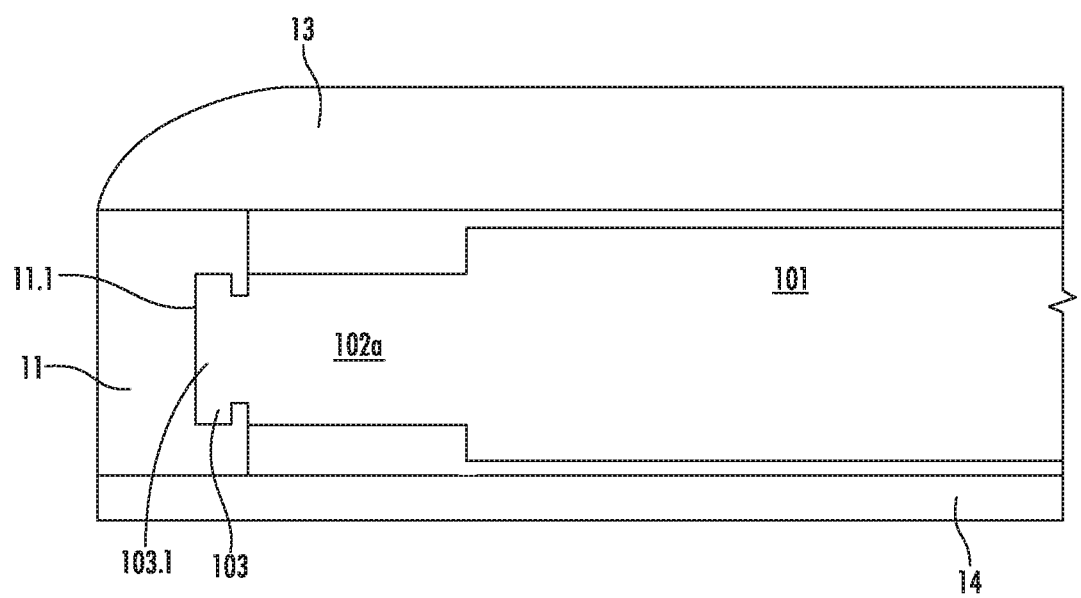
FIGS. 3A and 3B are partial section views of the amenities module of FIG. 1.
Figure 3B:
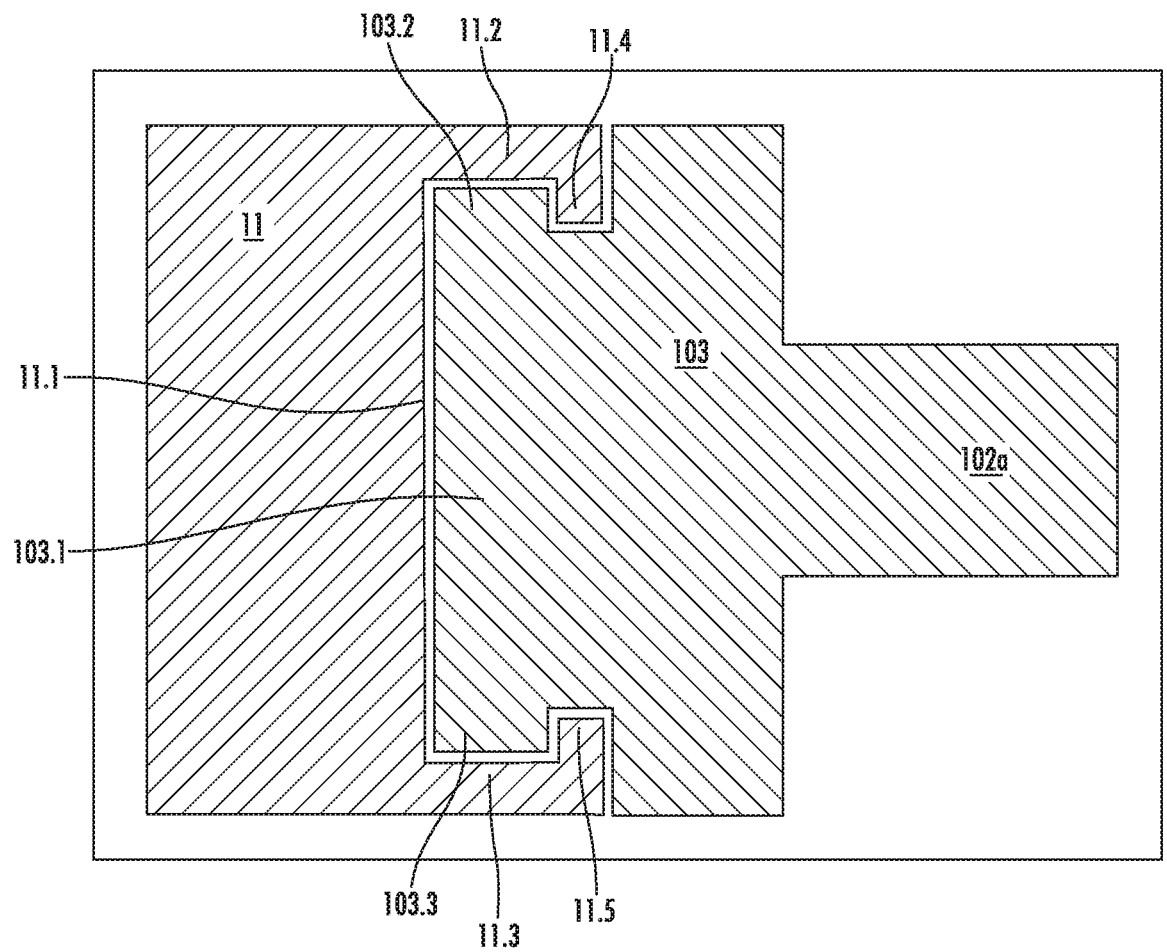

Movement of the amenities module 101 may be constrained by (1) the interface between the left slider portion 103 and the left frame member 11 and/or (2) the interface between the right slider portion 104 and the right frame member 12. FIGS. 3A and 3B show exemplary embodiments of the interface between the left slider portion 103 and the left frame member 11. As shown in FIG. 2, the left frame member 11 may include a channel 11.1. The channel 11.1, as shown in FIGS. 3A and 3B, may have shape that is complementary to a protrusion 103.1 of the left slider portion 103. For example, the protrusion 103.1 may include lateral extensions 103.2 and 103.3 that each engage a channel on the interior surface of the wings 11.2 and 11.3 of the left frame member 11 (where the wings 11.2 and 11.3 are adjacent to channel 11.1). As shown in FIG. 3B, wing 11.2 includes a projection 11.4 such that lateral extension 103.2 of the left slider portion 103 engages projection 11.4. Similarly, lateral extension 103.3 of the left slider portion 103 engages projection 11.5. These interfaces between left frame member 11 and left slider portion 103 constrain movement of the left slider portion 103 relative to the left frame member 11 in all directions except that the left slider portion 103 is capable of moving along a length of left frame member 11. The right slider portion 104 and the right frame member 12 may have a similar interface.

Although the interface between the left frame member 11 and left slider portion 103 is illustrated as a 'T' shape, the complementary shape of the protrusion and corresponding channel may have any appropriate shape or cross section, such as, but not limited to a dovetail, rounded, rectangular, or any other appropriate shape.

In some embodiments, the seat 10 includes a friction portion for holding the amenities module 101 in a given vertical position. The friction portion may be internal to the left slider portion 103 and/or the right slider portion 104 such that the friction portion is automatic and does not require any input during operation.

Figure 4:
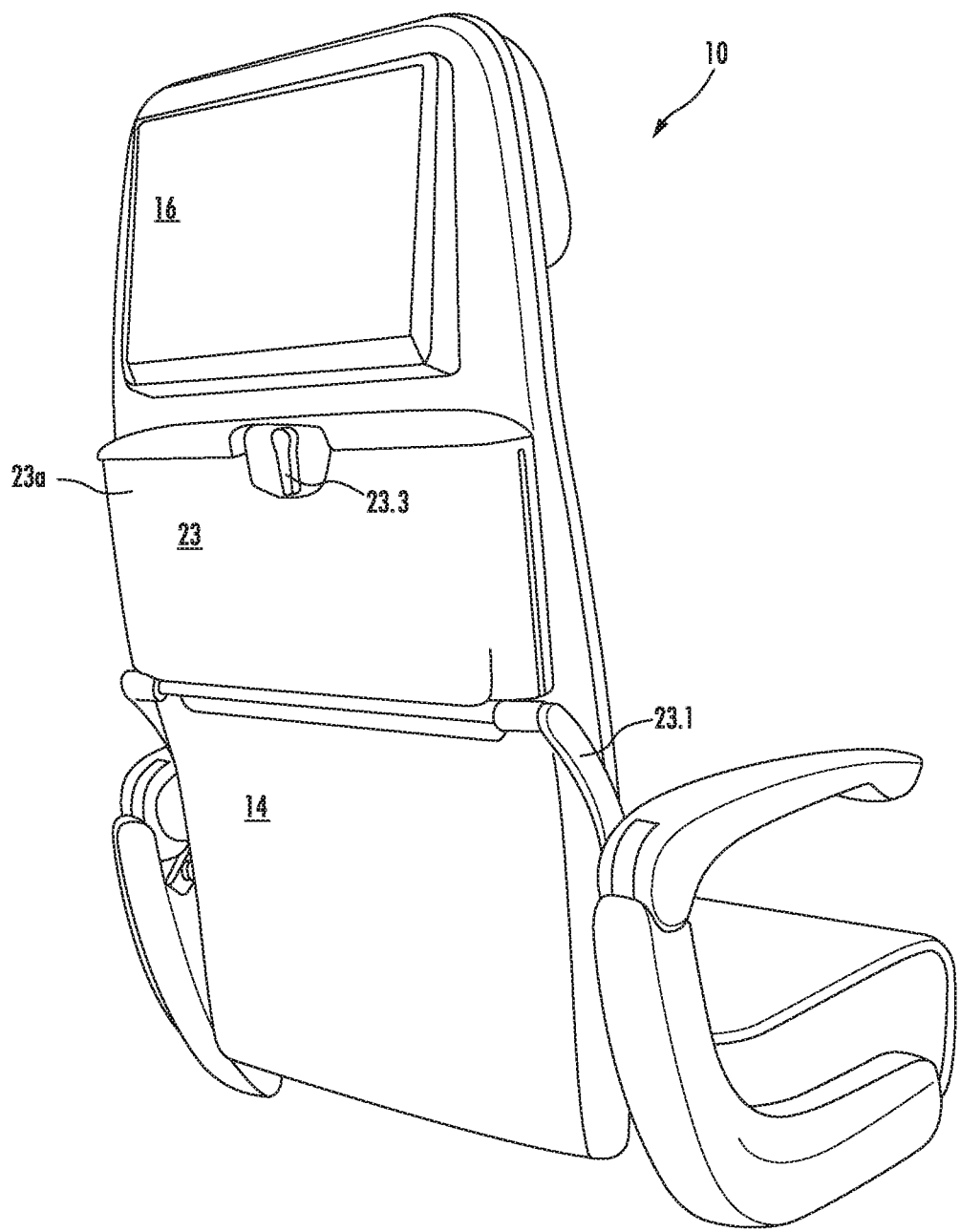
FIG. 4 is a perspective view of a passenger seat that includes an amenities module according to certain embodiments of the present invention.
Figure 5:
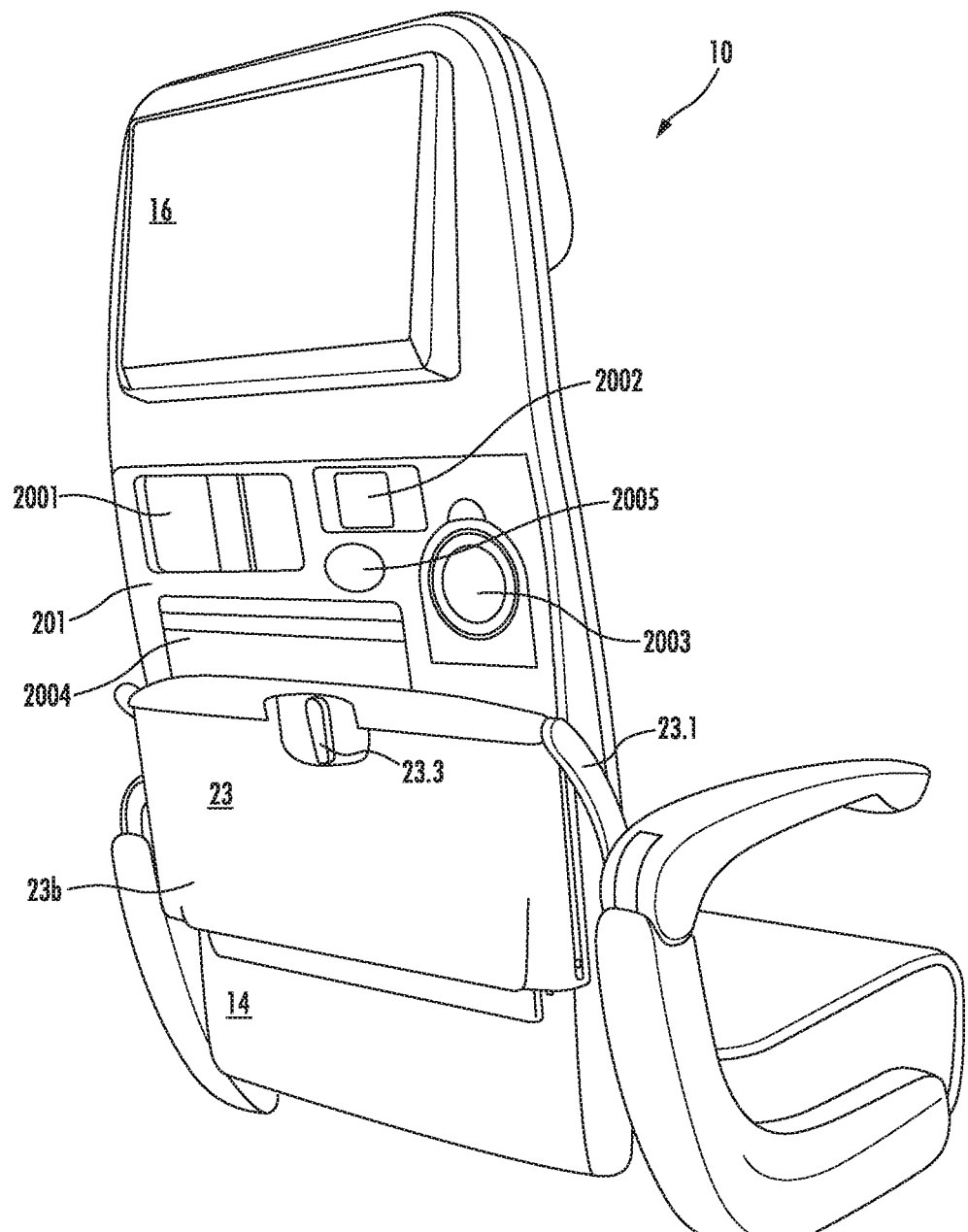
FIG. 5 is a perspective view of the passenger seat of FIG. 4.
Figure 6:
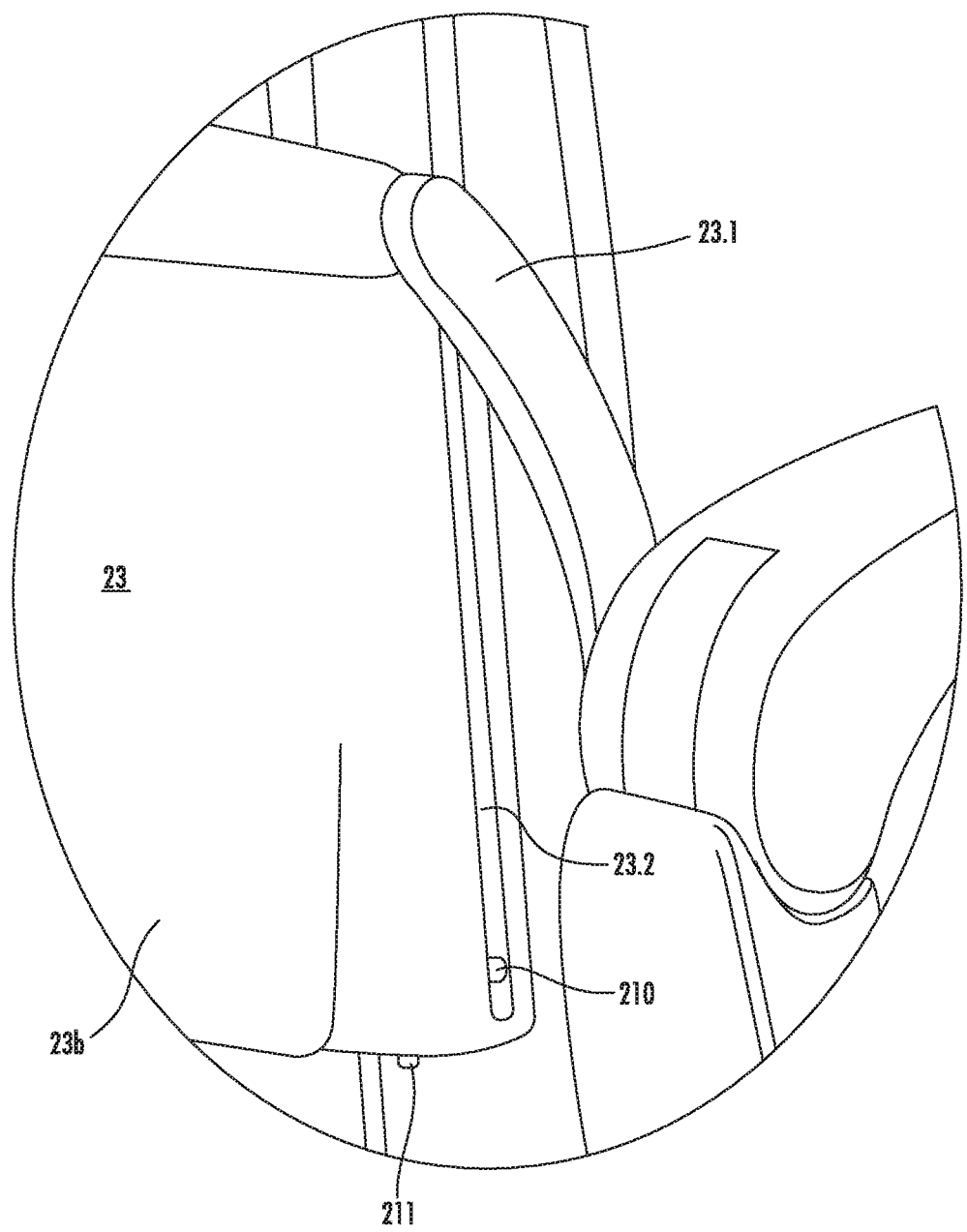
FIG. 6 is a detail perspective view of the passenger seat of FIG. 4.

The seat 10 may include at least one stop block 110 that limits motion of the amenities module 101 in the vertical direction. The at least one stop block 110 may be used to limit upward motion of the amenities module 101 to define a maximum height of the amenities module 101 and/or may be used to limit downward motion of the amenities module 101 to define a minimum height of the amenities module 101. In some embodiments, the at least one stop block 110 be attached to the left frame member 11 and/or the right frame member 12. Although the seat 10 shown in FIGS. 1-3B, does not include a video screen, the seat 10 may include a video screen 16 as shown in FIGS. 4-6, which may dictate the location of the uppermost position 101b. In some embodiments, the seat 10 is designed such that the locations of the lowermost position 101a and the uppermost position 101b may accommodate a wide range of passenger sizes. For example, the lowermost position 101a may accommodate a $5^{th}$ percentile female and the uppermost position 101b may accommodate a $95^{th}$ percentile male.

In addition to moving the amenities module 101 to the lowermost position 101a and/or the uppermost position 101b, the amenities module 101 may be exposed (or partially exposed) by pivoting the tray table 13 from the stowed position (e.g., see FIG. 1) to a deployed position (not shown) where the tray table 13 is approximately parallel to a ground or floor surface.

As shown in FIGS. 4-6, the passenger seat 10 may include a video screen 16, an amenities module 201, and a tray table 23, which is mounted on at least one arm 23.1. The amenities module 201 may be permanently attached and/or integral to the passenger seat 10. In addition to pivoting about an axis near a bottom edge (similar to conventional tray tables), the tray table 23 may be slidably movable relative to the passenger seat 10 such that the tray table 23 may translate between an upper position 23a (see FIG. 4) and a lower position 23b (see FIG. 5). In other words, in addition to a conventional stowed position (where the tray table is approximately parallel to the seat back) and a conventional deployed position (where the tray table extends rearward from the seat approximately parallel to the floor), the tray table 23 may include an additional position (i.e., the amenities position) where the tray table has translated downward relative to the seat 10 to expose the amenities module 201. As shown in FIG. 5, in the amenities position, the tray table 23 may be approximately parallel to the seat back. In addition to moving the tray table 23 to the lower position 23b, the amenities module 201 may be exposed (or partially exposed) by pivoting the tray table 23 to a deployed position (not shown) where the tray table 23 is approximately parallel to a ground or floor surface.

In some embodiments, the amenities module 201 includes a plurality of sections including a first section 2001, a second section 2002, a third section 2003, a fourth section 2004, and a fifth section 2005. Although FIG. 5 illustrates five sections, the amenities module 201 may include any number of sections (e.g., fewer or more than five). The sections may, for example, include at least one Universal Serial Bus (USB) port, at least one alternating current (AC) power port, an inductive wireless power unit (to provide wireless charging for a PED), a PED holder (e.g., a pivoting door/shelf, an articulating arm, or any other appropriate attachment mechanism), a reading light, headphone port (3.5 mm), a Bluetooth connection, a wireless local area network (WiFi) connection, a deployable mechanical attachment (e.g., a coat hook, a shelf, a storage pouch), or any other appropriate section. The quantity, type, layout, and other features for the sections are customizable based on needs of the consumer or provider (e.g., airline).

To move between the upper position 23a and the lower position 23b, the tray table 23 translates relative to at least one arm 23.1. In some embodiments, the tray table 23 moves relative to one arm 23.1 on each side of the tray table 23 (two total arms). As shown in FIG. 6, the tray table 23 may include a channel 23.2 that engages a pin on the arm 23.1. Although not shown in the drawings, the pin may extend from the arm 23.1 toward the arm on the opposite side of the seat 10.

In some embodiments, to maintain the tray table 23 in the upper position 23a, the tray table 23 may include a locking mechanism. For example, the locking mechanism may include a movable portion 210 that protrudes into the channel 23.2. In the upper position 23a, the movable portion 210 is above the pin of the arm 23.1 and the movable portion 210 prevents the pin of the arm 23.1 from moving above the movable portion 210 such that the tray table 23 may pivot about the arms 23.1 similar to a conventional tray table. To move the tray table 23 toward the lower position 23b, the movable portion 210 retracts toward the interior of the tray table 23 such that the pin of the arm 23.1 may move within channel 23.2 to a location above the movable portion 210 (as shown in FIG. 6). Movement of the movable portion 210 may be controlled by a mechanism or other control. For example, the tray table 23 may include an input 211 that operates a mechanism to retract the movable portion 210 such that a user may manipulate input 211 to allow the tray table 23 to move from the upper position 23a toward the lower position 23b.

As shown in FIG. 5, in some embodiments, when the tray table 23 is in the lower position 23b, the entire tray table frame, including the pivot lock mechanism 23.3 moves with the tray table 23 from the upper position 23a toward the lower position 23b. Although not shown in the drawings, in some embodiments, a portion of the tray table assembly (e.g., including the pivot lock mechanism 23.3) may remain in a typical position (as shown in FIG. 4) while the tray table 23 moves toward the lower position 23b such that the amenities module 201 is exposed.

The components of the seat 10 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the seat 10 may be attached to one another via suitable fasteners, which include, but are not limited to, screws, bolts, rivets or other mechanical or chemical fasteners.

In the following, further examples are described to facilitate understanding of aspects of the invention:

EXAMPLE A

A passenger seat comprising:
a tray table; and
an amenities module, wherein:
the passenger seat comprises at least one first configuration where the amenities module is concealed by the tray table;
the passenger seat comprises at least one second configuration where the amenities module is exposed; and
the tray table is approximately parallel to a seatback surface of the passenger seat in the at least one first configuration and in the at least one second configuration.

EXAMPLE B

The passenger seat of Example A or any of the preceding or subsequent examples, wherein the amenities module comprises at least one of a USB port, an AC power port, an inductive wireless power unit, a PED holder, a reading light, a headphone port, Wifi connection, and a deployable mechanical attachment.

EXAMPLE C

The passenger seat of Example A or any of the preceding or subsequent examples, wherein, in the first configuration, the amenities module is disposed between the tray table and a rear surface of the passenger seat.

EXAMPLE D

The passenger seat of Example A or any of the preceding or subsequent examples, wherein:
the amenities module is movable relative to the passenger seat; and
the at least one second configuration comprises at least one of (i) a lowermost position where the amenities module is located below the tray table and (ii) an uppermost position where the amenities module is located above the tray table.

EXAMPLE E

The passenger seat of Example D or any of the preceding or subsequent examples, further comprising a left frame member and a right frame member, wherein the amenities module slidably engages at least one of the left frame member and the right frame member.

EXAMPLE F

The passenger seat of Example E or any of the preceding or subsequent examples, wherein at least one of the left frame member and the right frame member comprises at least one stop block for limiting movement of the amenities module.

EXAMPLE G

The passenger seat of Example E or any of the preceding or subsequent examples, wherein the amenities module comprises a left arm extending from the amenities module toward the left frame member and a right arm extending from the amenities module toward the right frame member.

EXAMPLE H

The passenger seat of Example G or any of the preceding or subsequent examples, wherein:
the left arm comprises a left slider portion that interfaces with the left frame member; and
the right arm comprises a right slider portion that interfaces with the right frame member.

EXAMPLE I

The passenger seat of Example H or any of the preceding or subsequent examples, wherein:

the left frame member and the right frame member each comprise a channel;

the left slider portion comprises a protrusion that engages the channel of the left frame member; and the right slider portion comprises a protrusion that engages the channel of the right frame member.

EXAMPLE J

The passenger seat of Example I or any of the preceding or subsequent examples, wherein the protrusion of the left slider portion and the protrusion of the right slider portion each comprise a "T" shape.

EXAMPLE K

The passenger seat of Example A or any of the preceding or subsequent examples, wherein:

the tray table is slidably movable relative to the passenger seat; and the at least one second configuration comprises the tray table in a lower position below the amenities module.

EXAMPLE L

The passenger seat of Example K or any of the preceding or subsequent examples, further comprising an arm for attaching each side of the tray table, wherein each side of the tray table comprises a channel that interfaces with the respective arm.

EXAMPLE M

The passenger seat of Example K or any of the preceding or subsequent examples, further comprising a locking mechanism for securing the passenger seat in the first configuration such that the tray table is in an upper position that conceals the amenities module.

EXAMPLE N

An amenities module for a passenger seat comprising:
a main body;
a left arm extending from a left side of the main body;
a right arm extending from a right side of the main body; and at least one of a USB port, an AC power port, an inductive wireless power unit, a PED holder, a reading light, a headphone port, WiFi connection, and a deployable mechanical attachment, wherein:

the amenities module is slidably attached to a frame of the passenger seat;

the amenities module comprises a concealed position where the amenities module is concealed by a tray table of the passenger seat;

the amenities module comprises a lowermost position where the amenities module is below the tray table of the passenger seat and exposed; and the amenities module comprises an uppermost position where the amenities module is above the tray table of the passenger seat and exposed.

EXAMPLE O

The amenities module of Example N or any of the preceding or subsequent examples, wherein:

the left arm comprises a left slider portion that interfaces with a left frame member of the passenger seat; and the right arm comprises a right slider portion that interfaces with a right frame member of the passenger seat.

EXAMPLE P

The amenities module of Example O or any of the preceding or subsequent examples, wherein:

the left frame member and the right frame member each comprise a channel;

the left slider portion comprises a protrusion that engages the channel of the left frame member; and the right slider portion comprises a protrusion that engages the channel of the right frame member.

EXAMPLE Q

The amenities module of Example P or any of the preceding or subsequent examples, wherein the protrusion of the left slider portion and the protrusion of the right slider portion each comprise a "T" shape.

EXAMPLE R

A passenger seat comprising:
a tray table; and
an amenities module, wherein:

the tray table comprises an upper position where the tray table is approximately parallel with a seatback of the passenger seat and the amenities module is concealed by the tray table; and the tray table comprises a lower position where the tray table is approximately parallel with a seatback of the passenger seat and the tray table is translated below the amenities module such that the amenities module is exposed.

EXAMPLE S

The passenger seat of Example R or any of the preceding or subsequent examples, further comprising an arm for attaching each side of the tray table, wherein each side of the tray table comprises a channel that interfaces with the respective arm.

EXAMPLE T

The passenger seat of Example R or any of the preceding or subsequent examples, further comprising a locking mechanism for securing the tray table in the upper position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:
1. A passenger seat comprising:
a tray table; and
an amenities module, wherein:

the passenger seat comprises at least one first configuration where the amenities module is concealed by the tray table;

the passenger seat comprises at least one second configuration where the amenities module is exposed;

the tray table is approximately parallel to a seatback surface of the passenger seat in the at least one first configuration and in the at least one second configuration;

the amenities module is movable relative to the passenger seat; and the at least one second configuration comprises at least one of (i) a lowermost position where the amenities module is located below the tray table and (ii) an uppermost position where the amenities module is located above the tray table.

2. The passenger seat of claim 1, wherein the amenities module comprises at least one selected from the group of a USB port, an AC power port, an inductive wireless power unit, a PED holder, a reading light, a headphone port, WiFi connection, and a deployable mechanical attachment.

3. The passenger seat of claim 1, wherein, in the first configuration, the amenities module is disposed between the tray table and a rear surface of the passenger seat.

4. The passenger seat of claim 1, further comprising a left frame member and a right frame member, wherein the amenities module slidably engages at least one of the left frame member and the right frame member.

5. The passenger seat of claim 4, wherein at least one of the left frame member and the right frame member comprises at least one stop block for limiting movement of the amenities module.

6. The passenger seat of claim 4, wherein the amenities module comprises a left arm extending from the amenities module toward the left frame member and a right arm extending from the amenities module toward the right frame member.

7. The passenger seat of claim 6, wherein:
the left arm comprises a left slider portion that interfaces with the left frame member; and
the right arm comprises a right slider portion that interfaces with the right frame member.

8. The passenger seat of claim 7, wherein:
the left frame member and the right frame member each comprise a channel;
the left slider portion comprises a protrusion that engages the channel of the left frame member; and
the right slider portion comprises a protrusion that engages the channel of the right frame member.

9. The passenger seat of claim 8, wherein the protrusion of the left slider portion and the protrusion of the right slider portion each comprise a "T" shape.

10. The passenger seat of claim 1, wherein:
the tray table is slidably movable relative to the passenger seat; and
the at least one second configuration comprises the tray table in a lower position below the amenities module.

11. The passenger seat of claim 10, further comprising an arm for attaching each side of the tray table, wherein each side of the tray table comprises a channel that interfaces with the respective arm.

12. The passenger seat of claim 10, further comprising a locking mechanism for securing the passenger seat in the first configuration such that the tray table is in an upper position that conceals the amenities module.

13. An amenities module for a passenger seat comprising:
a main body;
a left arm extending from a left side of the main body;
a right arm extending from a right side of the main body; and
at least one selected from the group of a USB port, an AC power port, an inductive wireless power unit, a PED holder, a reading light, a headphone port, WiFi connection, and a deployable mechanical attachment, wherein:
the amenities module is slidably attached to a frame of the passenger seat;
the amenities module comprises a concealed position where the amenities module is concealed by a tray table of the passenger seat;
the amenities module comprises a lowermost position where the amenities module is below the tray table of the passenger seat and exposed; and
the amenities module comprises an uppermost position where the amenities module is above the tray table of the passenger seat and exposed.

14. The amenities module of claim 13, wherein:
the left arm comprises a left slider portion that interfaces with a left frame member of the passenger seat; and
the right arm comprises a right slider portion that interfaces with a right frame member of the passenger seat.

15. The amenities module of claim 14, wherein:
the left frame member and the right frame member each comprise a channel;
the left slider portion comprises a protrusion that engages the channel of the left frame member; and
the right slider portion comprises a protrusion that engages the channel of the right frame member.

16. The amenities module of claim 15, wherein the protrusion of the left slider portion and the protrusion of the right slider portion each comprise a "T" shape.

17. A passenger seat comprising:
a tray table;
an arm for attaching each side of the tray table; and
an amenities module, wherein:
each side of the tray table comprises a channel that interfaces with the respective arm;
the tray table comprises an upper position where the tray table is approximately parallel with a seatback of the passenger seat and the amenities module is concealed by the tray table; and
the tray table comprises a lower position where the tray table is approximately parallel with the seatback of the passenger seat and the tray table is translated below the amenities module such that the amenities module is exposed.

18. The passenger seat of claim 17, further comprising a locking mechanism for securing the tray table in the upper position.

* * * * *